(12) United States Patent
de Souza Filho et al.

(10) Patent No.: US 8,459,904 B2
(45) Date of Patent: Jun. 11, 2013

(54) CUTTING INSERT AND HOLDER FOR ROTATING APPLICATIONS

(75) Inventors: Ruy Frota de Souza Filho, Latrobe, PA (US); Adam South, Irwin, PA (US); Paul Albert Brown, Hostetter, PA (US); Mark A. Kerin, Blairsville, PA (US)

(73) Assignee: Kennametal Inc., Latrobe, PA (US)

( * ) Notice: Subject to any disclaimer, the term of this patent is extended or adjusted under 35 U.S.C. 154(b) by 483 days.

(21) Appl. No.: 12/821,793

(22) Filed: Jun. 23, 2010

(65) Prior Publication Data

US 2011/0318117 A1 Dec. 29, 2011

(51) Int. Cl.
*B23B 27/10* (2006.01)
*B23B 27/16* (2006.01)

(52) U.S. Cl.
USPC .............................. 407/11; 407/66; 407/103

(58) Field of Classification Search
USPC ...................... 407/11, 66, 102, 103, 104, 107
IPC .......................... B23B 27/10,27/16; B23C 5/28
See application file for complete search history.

(56) References Cited

U.S. PATENT DOCUMENTS

| | | | |
|---|---|---|---|
| 3,889,520 A * | 6/1975 | Stoferle et al. ................ | 73/37.5 |
| 4,178,818 A | 12/1979 | Yascheritsyn et al. | |
| 4,322,189 A * | 3/1982 | Briese ........................... | 409/136 |
| 4,993,888 A * | 2/1991 | Briese ........................... | 407/11 |
| 6,053,669 A * | 4/2000 | Lagerberg ..................... | 407/11 |
| 6,146,060 A | 11/2000 | Rydberg et al. | |
| 6,503,027 B2 | 1/2003 | Men | |
| 6,540,448 B2 * | 4/2003 | Johnson ......................... | 407/35 |
| 6,626,614 B2 | 9/2003 | Nakamura | |
| 6,896,450 B2 * | 5/2005 | Rothenstein ................... | 408/59 |
| 7,121,771 B2 * | 10/2006 | Englund ........................ | 407/103 |
| 7,156,006 B2 | 1/2007 | Hyatt et al. | |
| 7,273,331 B2 * | 9/2007 | Giannetti ....................... | 407/11 |
| 7,325,471 B2 | 2/2008 | Massa et al. | |
| 7,390,149 B2 * | 6/2008 | Wihlborg ....................... | 407/35 |
| 7,775,751 B2 * | 8/2010 | Hecht et al. .................... | 408/57 |
| 7,908,945 B2 * | 3/2011 | Dufour et al. .................. | 82/1.11 |
| 8,066,457 B2 * | 11/2011 | Buettiker et al. .............. | 409/234 |
| 2008/0175679 A1 * | 7/2008 | Prichard et al. ................ | 407/42 |
| 2008/0232909 A1 | 9/2008 | Filho et al. | |
| 2008/0232911 A1 | 9/2008 | Hyatt et al. | |
| 2009/0226268 A1 * | 9/2009 | Pilkington .................... | 407/113 |

FOREIGN PATENT DOCUMENTS

| | | | |
|---|---|---|---|
| DE | 3740814 A1 * | 6/1989 | |
| EP | 300172 A2 * | 1/1989 | |
| JP | 08039387 A * | 2/1996 | |
| JP | 09155622 A * | 6/1997 | |

(Continued)

OTHER PUBLICATIONS

Korean Intellectual Property Office, "International Search Report and Written Opinion", Dec. 15, 2011, 12 pp.

*Primary Examiner* — Daniel Howell
*Assistant Examiner* — Nicole N Ramos
(74) *Attorney, Agent, or Firm* — Larry R. Meenan, Esq.

(57) ABSTRACT

A cutting insert rotated about an axis may be utilized during a metal working operation and applied against the rotating workpiece to enhance tool performance. Coolant may be provided through the central bore of the cutting insert utilizing bypass ports around the threaded hold-down bolts. Additionally, the cutting insert may be held within the toolholder pocket utilizing hoop walls which follow a serpentine path to provide flexibility. Finally, relative rotation of the cutting insert with respect to the toolholder body may be prevented utilizing a pair of protrusions within the toolholder pocket which engage a pair of recesses within a side of the cutting insert.

49 Claims, 9 Drawing Sheets

FOREIGN PATENT DOCUMENTS

| | | | | |
|---|---|---|---|---|
| JP | 2002144112 A | * | 5/2002 | |
| JP | 2006055916 A | * | 3/2006 | |
| JP | 2007-504011 A | | 3/2007 | |
| KR | 10-2007-0041594 A | | 4/2007 | |
| KR | 10-2010-0015820 A | | 2/2010 | |

* cited by examiner

CUTTING INSERT AND HOLDER FOR ROTATING APPLICATIONS

BACKGROUND OF THE INVENTION

1. Field of the Invention

The invention is directed to metal working operations and, more particularly, to an assembly for rotating a cutting insert about a central axis during a metal working operation. The subject invention is also directed to the cutting insert itself, the toolholder for cutting the insert, and a design to provide coolant to the cutting insert.

2. Description of Related Art

During a metal working operation, such as a turning operation, where a stationary insert is urged against a rotating workpiece, the insert cutting edge acting upon the workpiece is heated by the workpiece until the operation is complete or until the cutting edge begins to break down through a failure mechanism, such as creater wear or plastic deformation. To avoid these modes of failure, and to permit more efficient operation of the cutting insert, in the past, circular cutting inserts have been mounted upon toolholders, such that the cutting inserts were freely rotatable about the insert central axis. A particular cutting insert was then presented to the workpiece and oriented in such a fashion that the rotary motion of the workpiece on, for example, a lathe, imparted to the cutting insert a force acting in a direction tangential to the insert. The motion of the workpiece acted against the cutting insert not only to machine the workpiece but, furthermore, to rotate the circular cutting insert such that the cutting edge of the insert was continuously refreshed. As a result, under ideal conditions, no single segment of the cutting edge experienced prolonged exposure to the workpiece. Furthermore, the cutting edge operated at a lower temperature, thereby allowing greater cutting forces and improved efficiency of the metal working operation.

This type of spinning insert may exhibit extraordinarily long tool life and remarkable speeds. However, this same spinning insert may fail in an equally dramatic fashion when the cutting conditions change slightly, or when the cartridge bearings, used by the cutting insert for rotating, begin to deteriorate.

A method and assembly are needed capable of rotating the cutting insert about its own axis during a metal working operation, whereby the speed and direction of rotation is not determined by the rotation of the workpiece itself, but is determined by independent forces acting upon the cutting insert. In conjunction with this, a design is needed which may efficiently introduce coolant to the cutting insert.

SUMMARY OF THE INVENTION

In one embodiment of the subject invention, a cutting insert is comprised of a circular body having a central axis extending therethrough. The insert is intended to machine a workpiece. The body has a top surface and a bottom surface with a central bore having a diameter and extending through the body between the top surface and the bottom surface. At least one side extends around the body between the top surface and the bottom surface. A cutting edge extends along the intersection of the at least one side and the top surface. A central plateau extends about the central bore from the top surface of the body. The plateau includes radial horizontal slots across the top and along the width of the plateau to provide a path for coolant from the central bore of the body.

Another embodiment of the subject invention is directed to a toolholder for holding a circular cutting insert. The insert is intended to machine a workpiece by rotation of the insert about the central axis. The toolholder is comprised of a body having central axis extending therethrough. The body is comprised of a pocket extending within the top of the toolholder for accepting the circular insert. The pocket is surrounded by a hoop defining a pocket floor, an inner hoop wall, and an outer hoop wall. A threaded holding bore extends downwardly through the pocket floor to a central coolant bore. The threaded holding bore is adapted to receive a threaded hold-down bolt. At least two bypass ports are offset from the threaded holding bore but fluidly connect the central coolant bore and the pocket floor, thereby capable of providing coolant between the central coolant bore and the pocket when a hold-down bolt obstructs the threaded holding bore.

Another embodiment of the subject invention is directed to a toolholder system comprised of a toolholder body and a circular cutting insert mounted within the toolholder body. The toolholder body has a bore along a central axis extending therethrough and a pocket extending within the top of the toolholder for accepting the circular insert. The pocket is surrounded by a hoop defining a pocket floor, an inner hoop wall, and an outer hoop wall. A threaded holding bore extends downwardly through the pocket floor to a central coolant bore. The threaded holding bore is adapted to receive a threaded hold-down bolt. At least two bypass ports are offset from the threaded holding bore but fluidly connect the central coolant bore and the pocket floor, thereby capable of providing coolant between the central coolant bore and the pocket when a hold-down bolt obstructs the threaded holding bore. The circular cutting insert has a circular body with a central axis extending therethrough, a top surface and a bottom surface. A central bore has a diameter and extends through the body between the top surface and the bottom surface. At least one side extends around the body between the top surface and the bottom surface. A cutting edge extends along the intersection of the at least one side and the top surface. A central plateau extends about the central bore from the top surface of the body. The plateau includes radial horizontal slots across the top and along the width of the plateau to provide a path for coolant from the central bore of the body. A hold-down bolt has a head and a shank, wherein a portion of the shank is threadedly engaged with the threaded holding bore and the head retains the cutting insert within the pocket. The shank diameter in the region of the cutting insert bore is sufficiently less than the diameter of the central bore such that there is a gap therebetween fluidly connecting the at least two bypass ports with the radial horizontal slots of the cutting insert.

Yet another embodiment of the subject invention is directed to a cutting insert having a circular body with a central axis extending therethrough. The body has a top surface and a bottom surface with a central bore having a diameter and extending through the body between the top surface and the bottom surface. A side extends around the body between the top surface and the bottom surface. There are only two diametrically opposed indentations within the side adapted to engage protrusions within the inner wall of a pocket within a toolholder body to prevent relative rotation of the insert relative to the toolholder body. A cutting edge extends along the intersection of the at least one side and the top surface.

Yet another embodiment of the subject invention is directed to a toolholder for holding a circular cutting insert. The toolholder is comprised of a body having a central axis extending therethrough. The body is comprised of a pocket extending within the top of the toolholder for accepting the circular insert. The pocket is surrounded by a hoop defining a pocket floor, an inner hoop wall, and an outer hoop wall. The hoop is generally circular with a hoop diameter but follows an oscillating serpentine path about a radius defining the cylinder to provide flexibility for radial expansion of the hoop.

BRIEF DESCRIPTION OF THE DRAWINGS

FIG. 5B' is an enlarged version of FIG. 5B;

DETAILED DESCRIPTION OF THE INVENTION

Figure 1:
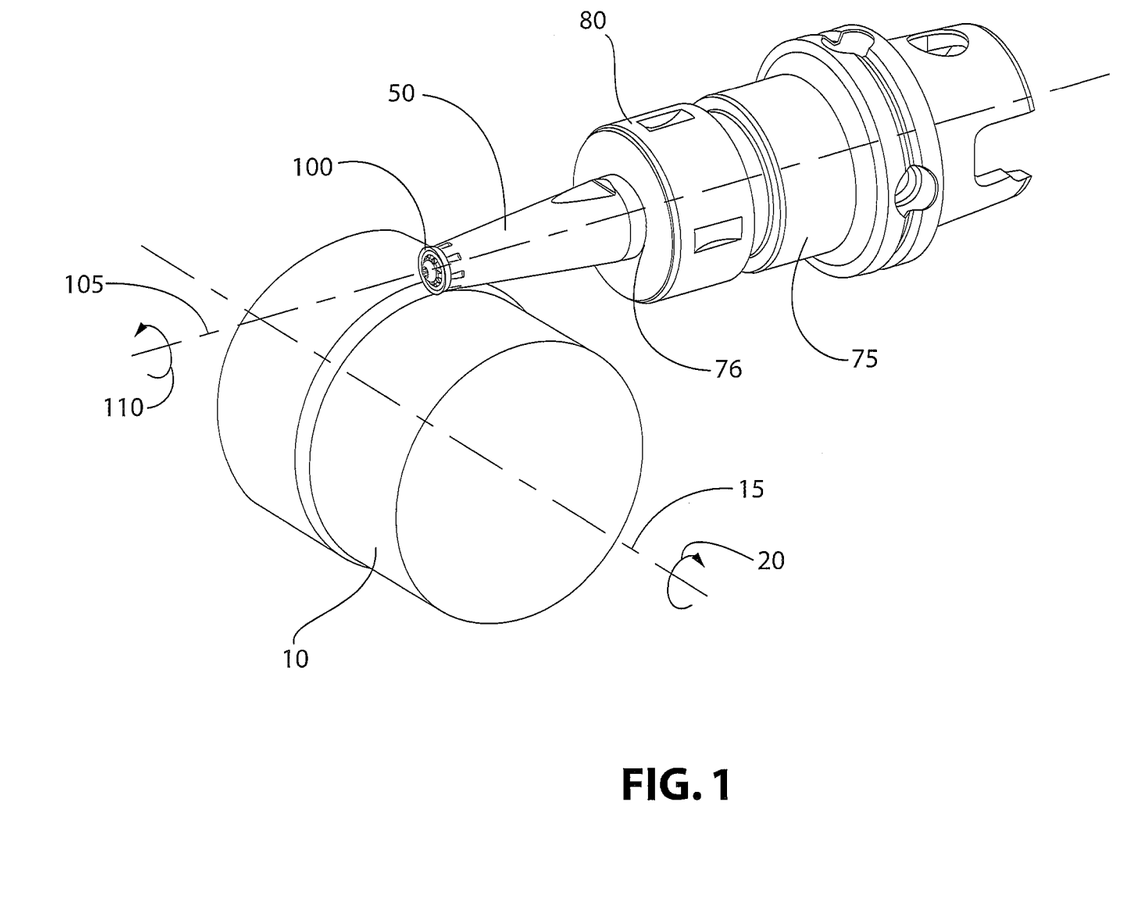
FIG. 1 is a perspective view of the toolholder with a rotatable insert operating upon a rotating workpiece in accordance with the subject invention.
Figure 2:
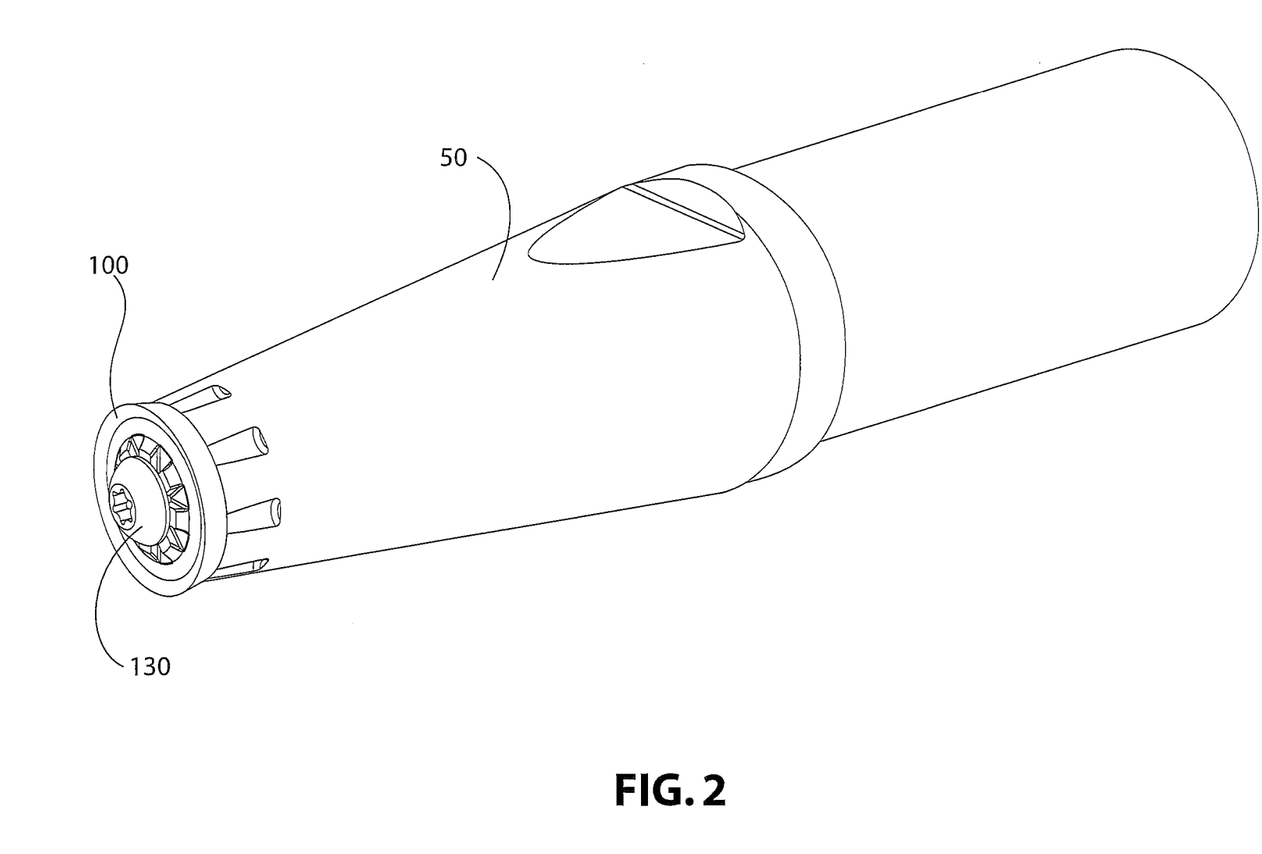
FIG. 2 is a perspective view of the toolholder system illustrated in FIG. 1 in accordance with the subject invention.

FIG. 1 illustrates a workpiece 10 rotating about the centerline 15 in a direction indicated by arrow 20 wherein, for example, the workpiece 10 is mounted upon a lathe. A toolholder 50 has mounted thereupon a cutting insert 100. The cutting insert 100 has a central axis 105. The insert 100 is secured to the toolholder 50 in a non-rotatable fashion such that rotation of the toolholder 50 is translated directly to the rotation of the cutting insert 100. As one example, the insert 100 and the toolholder 50 may rotate in a direction illustrated by arrow 110. The toolholder 50 may be secured within an adapter 75, which is mounted to a spindle, and which then would be mounted to a machine tool capable of rotating the adapter 75 in the desired direction and at the desired predetermined rotational speed. The toolholder 50 may be secured within the adapter using any number of techniques known to those skilled in the art of rotary tools. However, as illustrated in FIG. 1, the adapter 75 has an internal bore 76 therein which accepts the toolholder 50 and secures the toolholder 50 within the adapter 75 utilizing, for example, a locking nut 80 which is threadably secured to the body of the adapter 75 and urges the toolholder 50 therein. The mechanism for securing the toolholder 50 within the adapter 75 may be one of many different mechanisms including a collet or a lock screw and such mechanisms are well know to those skilled in the art of rotating tools.

A toolholder assembly is comprised in part of the cutting insert 100 illustrated in detail in FIGS. 2, 3, and 4A-4C. The cutting insert 100 is comprised of a circular body 102 having a central axis 105 extending therethrough. The insert body 102 has a top surface 107 and a bottom surface 109. A central bore 112 having a diameter D1 extends through the body 102 between the top surface 107 and the bottom surface 109. A side 114 extends downwardly from the top surface 107 and is angled at a clearance angle A of between 5-30 degrees. A shoulder 116 extends radially inwardly from the side 114 to a generally vertical wall 118. The wall extends downwardly to a chamfer 119 that intersects with the bottom surface 109. The chamfer 119 may have an angle Y between 0 and 30 degrees to ease insertion of the insert 100 into a toolholder pocket.

Figure 4A:
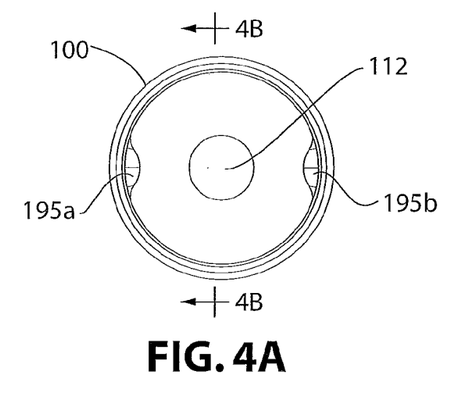
FIG. 4A is a bottom view of a cutting insert that may be used with a toolholder discussed herein.
Figure 4B:
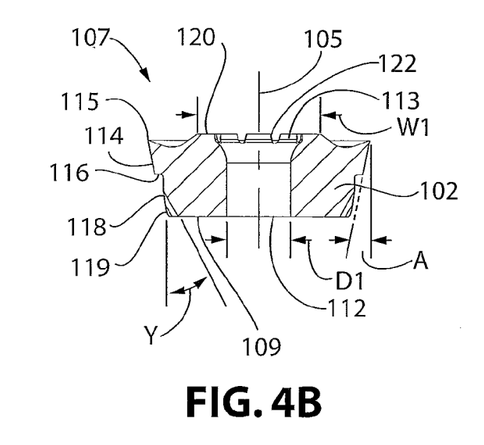
FIG. 4B is a side view of the cutting insert illustrated in along lines "4B-4B" in FIG. 4A.
Figure 4C:
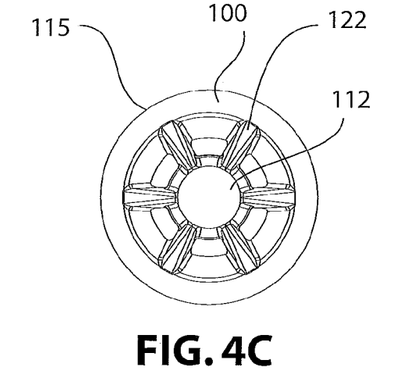
FIG. 4C is a top view of the cutting insert illustrated in FIG. 4A.

A cutting edge 115 extends along the intersection of the side 114 and the top surface 107.

The generally vertical wall 118 may be completely vertical or may taper inwardly as the wall 118 extends downwardly to mate with a toolholder pocket having a cylindrical shape or a taper inwardly as the pocket deepens.

Of particular interest, a central plateau 120 extends about the central bore 112 from the top surface 107 of the body 102. The plateau 120 includes radial horizontal slots 122 across the top surface 107 and along the width W1 of the plateau 120. As will be explained, these slots 122 provide a path for coolant fluid supplied through the central bore 112 of the body 102.

Figure 3:
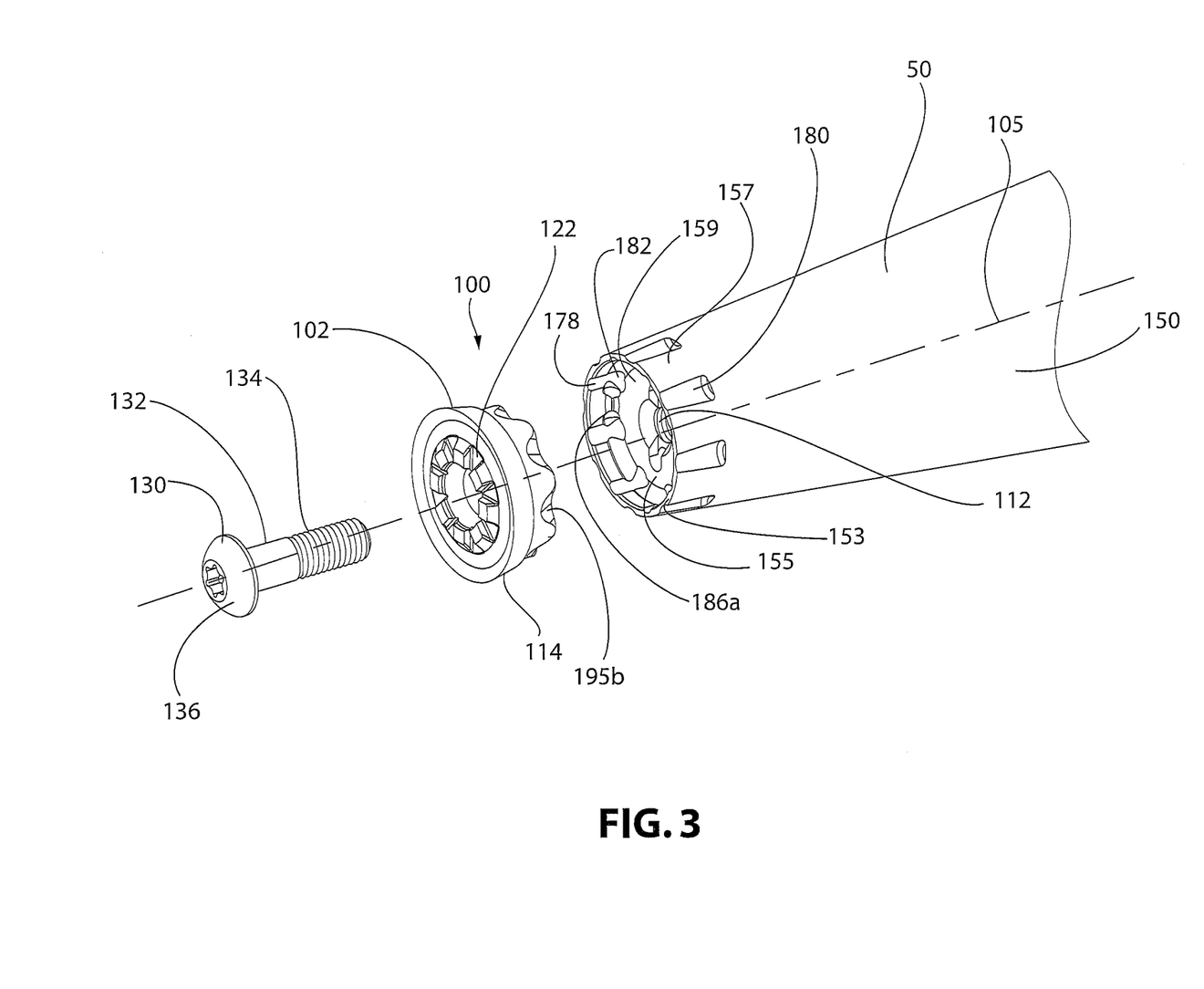
FIG. 3 is an exploded perspective view of the arrangement illustrated in FIG. 2.
Figure 6:
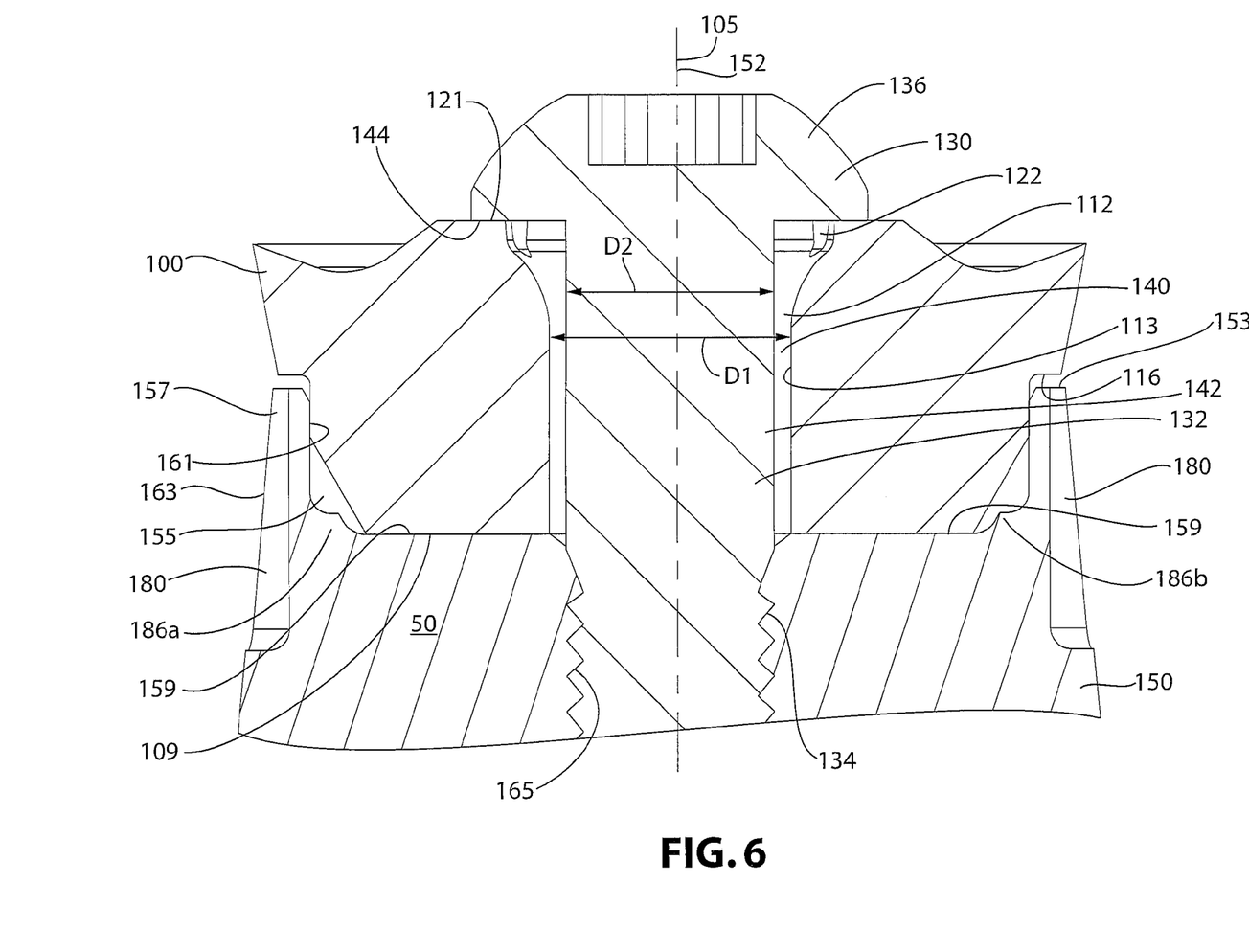
FIG. 6 is a cross sectional view of the toolholder similar to that illustrated in FIG. 5A, however, including a cutting insert within the pocket of the toolholder secured therein with a hold-down bolt.

Returning to FIG. 3, the cutting insert 100 may further include a hold-down bolt 130 with a shank 132 having a threaded portion 134. As illustrated in FIG. 3 and as furthermore illustrated in FIG. 6, the hold-down bolt 130 fits within the central bore 112 and has a head 136. The shank 132 has a diameter D2 which is sufficiently smaller than the diameter D1 of the central bore 112 to define a coolant gap 140 between the shank 132 and the wall 113 of the central bore 112 along the length of the central bore 112. As illustrated in FIG. 6, the portion 142 of the bolt 130 along the length of the central bore 112 may be unthreaded.

As furthermore illustrated in FIG. 6, the bolt head 136 has an underside 144 that is generally planar and contacts the top 121 of the central plateau 120 to provide a flush fit. As furthermore illustrated in FIGS. 3 and 6, the top 121 of the central plateau 120, with the exception of the radial horizontal slot 122, may be planar. Additionally, the insert bore 112, in the direction of the bottom surface 109 to the top surface 107, may diverge in the region of the central plateau 120.

FIGS. 3 through 6 illustrate the toolholder 50 comprised of a body 150 having a central axis 152 extending therethrough and co-axial with the cutting insert central axis 105. The body 150 has a pocket 155 extending within the top of the toolholder body 150 for accepting the cutting insert 100. The pocket 155 is surrounded by a hoop 157 defining a pocket floor 159, an inner hoop wall 161, and an outer hoop wall 163. As illustrated in FIGS. 5A and 6, a threaded holding bore 165 is adapted to receive the threaded hold-down bolt 130.

Figure 7:
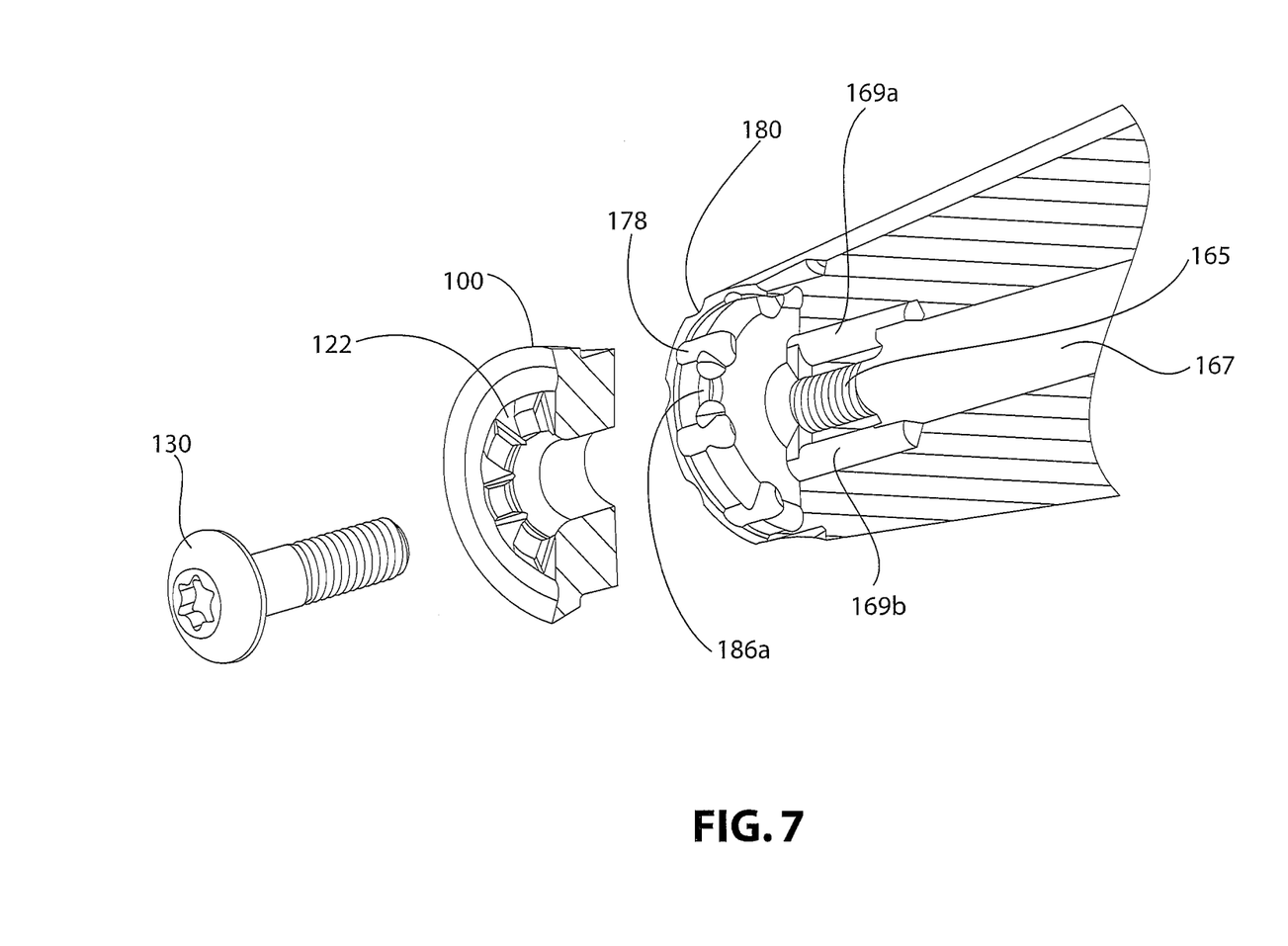
FIG. 7 is an exploded perspective view of the arrangement illustrated in FIG. 6.

Typically, coolant traveling through a toolholder travels the entire length of a central bore and is ejected at the end of the toolholder. However, in the present design, the hold-down bolt 130 acts as an obstruction to the toolholder central bore 167. To overcome this obstruction, directing attention to FIGS. 7 and 8, bypass ports 169a, 169b are offset from the threaded holding bore 165 but fluidly connected to the central coolant bore 167 of the toolholder body 150 to provide coolant between the central coolant bore 167 and the pocket 155 when a hold-down bolt 130 obstructs the threaded holding bore 165.

Figure 5A:
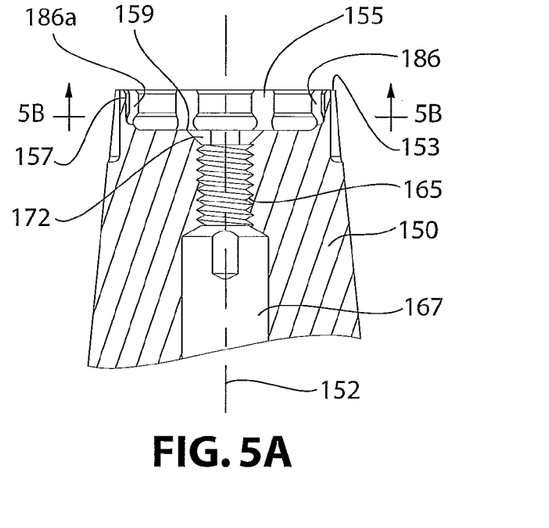
FIG. 5A is a cross sectional view of the toolholder in accordance with the subject invention.
Figure 5B:
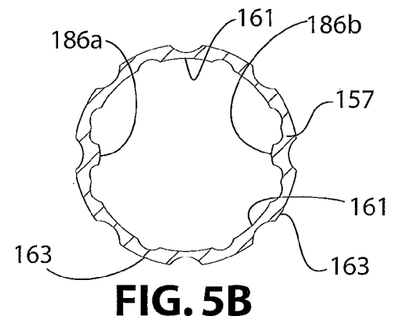
FIG. 5B is cross sectional view along arrows "5B-5B" in FIG. 5A.
Figure 5C:
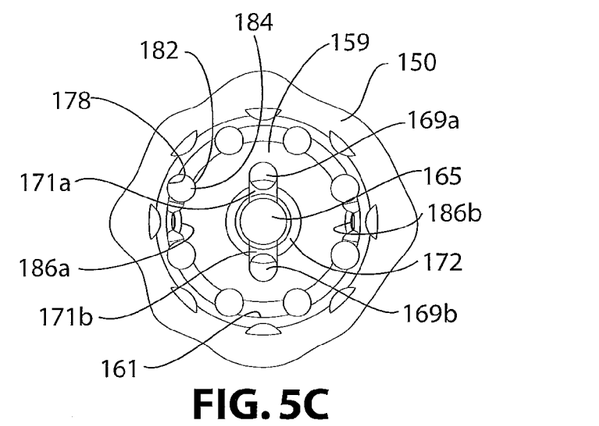
FIG. 5C is a top view of the toolholder illustrated in FIG. 5A.
Figure 8:
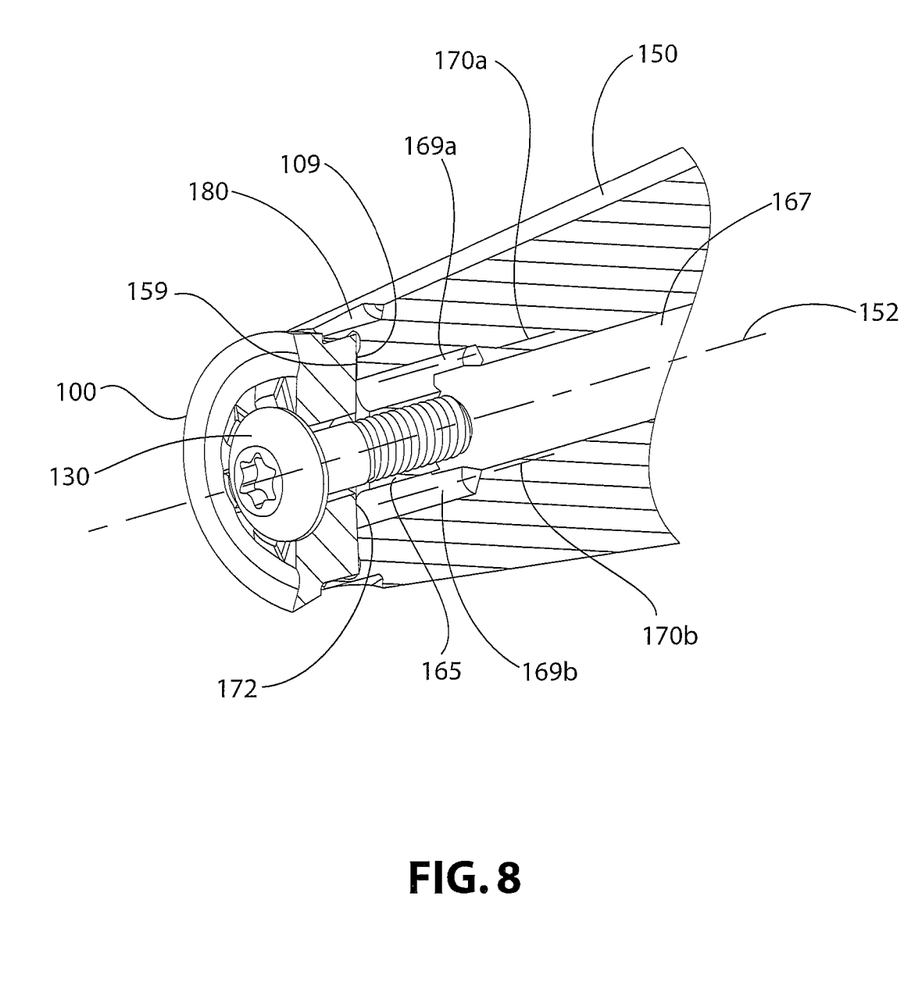
FIG. 8 is an assembled perspective view of the arrangement illustrated in FIG. 6.

As illustrated in FIG. 5C, each of the bypass ports 169a, 169b may be a cylindrical bore through the toolholder body 150 adjacent to the threaded holding bore 165. As illustrated in FIG. 8, each bypass port 169a, 169b has a centerline 170a, 170b that is offset from the central axis 152 of the toolholder central bore 167.

Because the bypass ports 169a, 169b deliver coolant to the pocket 155 only at particular locations within the pocket 155, the toolholder 150 may further include a manifold 172 (FIGS. 5A and 6) within the pocket floor 159 adjacent to the threaded coolant bore 167 to accept and distribute coolant around the central bore 112 of the cutting insert 100. The manifold 172 may be a conically shaped recess. Additionally, as illustrated in FIG. 5C, the bypass ports 169a, 169b do not fully intersect with the manifold 172. To permit unobstructed flow from the bypass ports 169a, 169b, grooves 171a, 171b cut across the pocket floor 159 to fully connect the bypass ports 169a, 169b with the manifold 172.

Because the toolholder body 50 with the insert 100 therein may be used for high speed rotating applications, the bypass ports 169a, 169b may be similar in size and radially symmetric about the body central axis 152.

Figure 9:
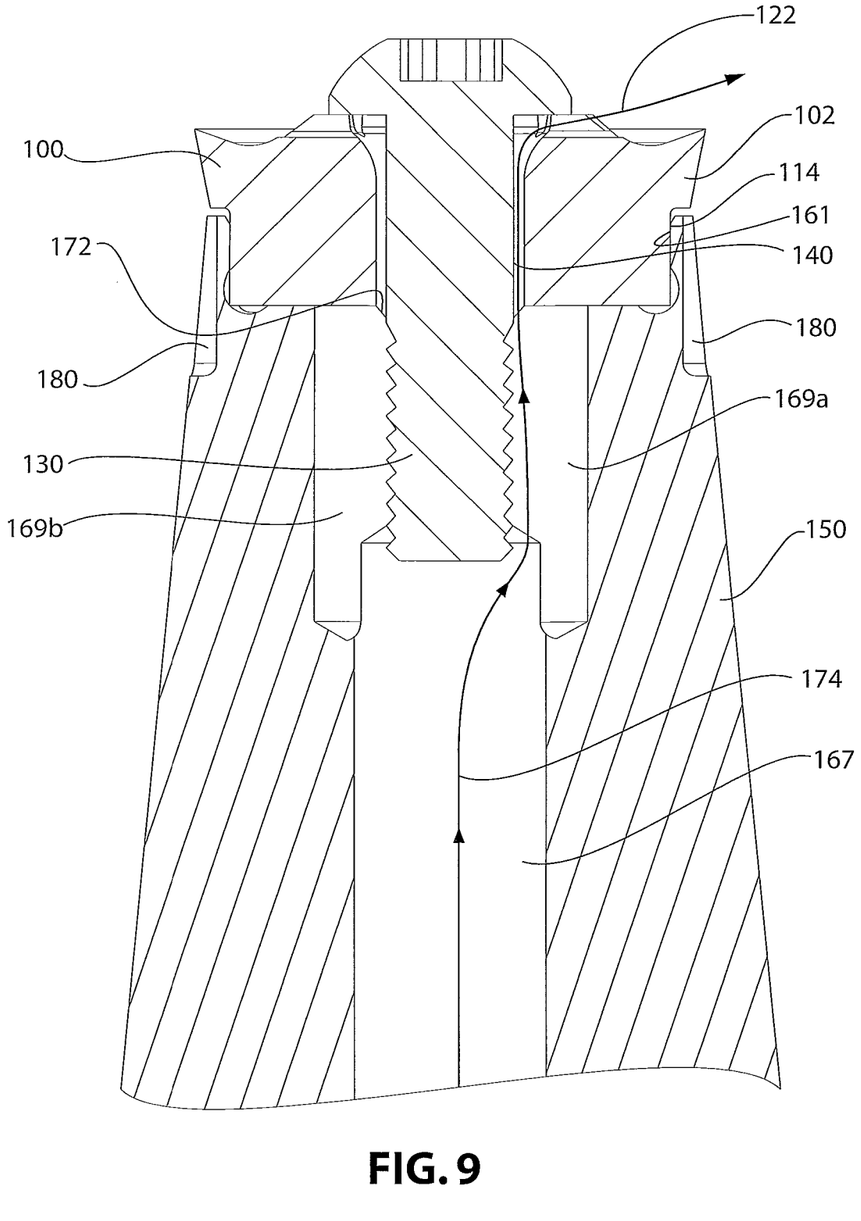
FIG. 9 is a cross sectional view of the assembly illustrated in FIG. 8 highlighting the flow path of coolant fluid.

FIG. 9 illustrates a path line 174 showing the path of the coolant from the toolholder central bore 167 through the bypass ports 169a, 169b into the manifold 172 through the gap 140 and then through the radial horizontal slots 122 where it is expelled.

In one embodiment of the subject invention, the wall 118 of the cutting insert 110 is cylindrical and the inner hoop wall 161 of the pocket 155 is cylindrical and there is an interference fit between the cutting insert wall 118 and the inner hoop wall 161 of the pocket 155.

Returning to FIG. 8, it is apparent that, as the result of the hold-down bolt 130, the central coolant bore of the toolholder body may extend only as far as the threaded holding bore 165. As furthermore illustrated in FIG. 8, the bypass ports 169a, 169b have centerlines 170a, 170b that are offset from central axis 152 of the toolholder body 150. The bottom surface 109 of the cutting insert 100 is flush with the planar floor 159 of the pocket 155 to axially locate the insert 100 and to provide a fluid seal therebetween. However, it is also possible for the shoulder 116 to abut with the end 153 (FIG. 3 and FIG. 8) of the toolholder body 150 to axially locate the cutting insert 100 within the pocket 155 and to provide a fluid seal therebetween.

What has so far been described is a design for providing coolant to the cutting region of a rotating cutting insert when the rotating cutting insert is secured to a rotating toolholder body using a centrally located hold-down bolt.

In another embodiment of the subject invention, to secure the cutting insert 100 within the toolholder body 150, another design feature complements and/or replaces the hold-down bolt 130.

Directing attention to FIGS. 3 and 5A-5C, the hoop 157 of the toolholder body 150 is generally circular having a hoop diameter D3 but follows an oscillating serpentine path 176 about a radius R3 following the hoop diameter D3 to provide flexibility for radial expansion of the hoop 157. This radial flexibility provides some leeway and reduces the need for tight tolerances to mate the cutting insert 100 with the toolholder 50. Directing attention to FIGS. 5B and 5B', the serpentine path 176 is comprised of interior slices 178 taken from the inner hoop wall 161 and exterior slices 180 taken from the outer hoop wall 163. The internal slices 178 and the external slices 180 may form an arc 181 about the respective inner hoop wall 161 and outer hoop wall 163 having an arc angle A1, A2, respectively. The purpose of the internal slices 178 and the external slices 180 is to provide flexibility for radial expansion of the hoop 157. The size and locations of the curved slices 178, 180 may vary. While the shape of the slices 178, 180 is illustrated as curved, they may have any number of shapes including rectangles, C-shaped, or U-shaped. However, it is important that any surface that would form an inwardly facing sharp edge or corner would be rounded to reduce any stress concentrations caused by such a sharp edge or corner. Additionally, depending upon the thickness between the inner hoop wall 161 and the outer hoop wall 163, the slices 178, 180 may have a circular shape, whereby only a portion of the circle is not penetrating the thickness. The inner hoop wall 161 has an inner hoop diameter D4 and the outer hoop wall 163 has an outer hoop diameter D5, wherein the hoop walls 161, 163 between the curved slices 178, 180 maintain their respective diameters. As illustrated in FIG. 5B, the interior curved slices 178 alternate with the exterior curved slices 180 about the circumference of the hoop 157.

Directing attention to FIGS. 3 and 5C, the interior curved slice 178 comprises a cylindrical hole 182 extending into the pocket floor 159, wherein the cylindrical hole centerline 184 is spaced from the inner hoop wall 161 such that the projection of the cylindrical hole 182 onto the inner hoop wall 161 is an arc 181, as previously discussed.

Directing attention to FIGS. 4A and 5A-5C, the toolholder body 150 further includes at least two protrusions 186a, 186b extending radially inwardly from the pocket 155, wherein the protrusions 186a, 186b are adapted to engage two matching indentations 195a, 195b (FIG. 4A) within the wall 118 of the cutting insert 100 mounted within the pocket 155. Directing attention to FIGS. 4A-4C, the wall 118 of the cutting insert body 102 includes at least two diametrically opposed indentations 195a, 195b within the wall 118 adapted to engage the protrusions 186a, 186b within the inner hoop wall 161 of the pocket 155 of the toolholder body 150 to prevent relative rotation of the cutting insert 100 relative to the toolholder body 150. It is necessary to have only two indentations 195a, 195b to engage the two protrusions 186a, 186b of the cutting insert 100. However, FIG. 3 illustrates a cutting insert 100 with indentations around its entire perimeter. This provides additional strength and rigidity to the insert body 102 since less material is removed from the body 102. As illustrated in FIG. 4B, the indentations 195a, 195b extend from the bottom surface 109 partially up the side 114 of the insert body 102. In another embodiment, posts (not shown) could be inserted within the holes 179 created by the interior slice 178 and these posts would engage the indentations 195a, 195b within the wall 116 of the insert 100. These posts would replace the currently illustrated protrusions 186a, 186b.

Directing attention again to FIG. 5A, the protrusions 186a, 186b are located adjacent to the pocket floor 159, and may be located at the intersection of the inner hoop wall 161 with the pocket floor 159. Directing attention to FIG. 5B, the protrusions 186a, 186b may extend upward along the entire length of the inner hoop wall 161. As shown in FIG. 9, the wall 118 of the insert body 102 mates with the inner hoop wall 161 to preferably form an interference fit. The serpentine path 176 of the hoop 157 should provide sufficient radial flexibility so that insertion of the cutting insert 100 into the toolholder 50 is relatively easy. However, to assist, a chamfer 119 may be introduced adjacent to the wall 118. As an example, for a toolholder having an end with a 14 mm nominal diameter, the interference may be between 0-0.05 mm. As a result of the flexible hoop 57 design, the forces the head 136 of the hold-down bolt 130 impart to the cutting insert body 102 to urge it into the pocket may be less since the insert body 102 is retained within the pocket 155 by the flexible hoop 157. Additionally, as illustrated in FIG. 6, the bottom surface 109, of the insert body 102 abuts against the floor 159 of the pocket 155 to axially locate the cutting insert body 102 within the toolholder body 150. As previously mentioned, it is also possible for the shoulder 116 of the insert 100 to abut with the end 153 of the toolholder body 150 to axially locate the cutting insert body 102 within the toolholder body 150.

While the toolholder 50 has been discussed with respect to rotary applications, it should be appreciated that the toolholder 50 or another toolholder having a similar pocket configuration may be effective for non-rotating applications also and use of the subject invention is by no means limited to only rotating applications.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A cutting insert comprised of a circular body having a central axis extending therethrough, wherein the insert is intended to machine a workpiece by rotation of the insert about the central axis and, wherein the body has:
   a) a top surface and a bottom surface;
   b) a central bore having a diameter and extending through the body between the top surface and the bottom surface;
   c) a side extending around the body between the top surface and the bottom surface;
   d) a cutting edge extending along the intersection of the side and the top surface, and
   e) a central plateau extending about the central bore from the top surface of the body, wherein the plateau includes radial horizontal slots across the top and along the width of the plateau to provide a path for coolant from the central bore of the body.

2. The cutting insert according to claim 1, wherein the wall of the body is cylindrical or mildly tapered for acceptance within a pocket of a toolholder.

3. The cutting insert according to claim 1, further including a hold-down bolt with a threaded end, wherein the hold-down bolt fits within the central bore and has a head and has a shank with a diameter, and wherein the diameter of the shank is sufficiently smaller than the diameter of the central bore to define a coolant gap between the shank and the central bore along the length of the central bore.

4. The cutting insert according to claim 3, wherein the shank of the bolt along the length of the central bore is unthreaded.

5. The cutting insert according to claim 3, wherein the bolt head has an underside that is generally planar and contacts the top of the plateau to provide a flush fit.

6. The cutting insert according to claim 5, wherein the top of the plateau is planar.

7. The cutting insert according to claim 1, wherein the insert bore in the direction of the bottom to the top diverges in the region of the plateau.

8. A toolholder for holding a circular cutting insert, wherein the toolholder is comprised of a body having a central axis extending therethrough, wherein the body is comprised of:
   a) a pocket extending within the top of the toolholder for accepting the circular insert, wherein the pocket is surrounded by a hoop defining a pocket floor, an inner hoop wall, and an outer hoop wall;
   b) a threaded holding bore extending downwardly through the pocket floor to a central coolant bore, wherein the threaded holding bore is adapted to receive a threaded hold-down bolt;
   c) at least two bypass ports offset from the threaded holding bore but fluidly connecting the central coolant bore and the pocket floor, thereby able to provide coolant between the central coolant bore and the pocket when a hold-down bolt obstructs the threaded holding bore.

9. The toolholder according to claim 8, wherein each of the at least two bypass ports is a cylindrical bore through the toolholder body adjacent to the threaded holding bore.

10. The toolholder according to claim 9, wherein the at least two bypass ports have a centerline that is offset from the centerline of the threaded holding bore.

11. The toolholder according to claim 9, further including a manifold recessed within the pocket floor adjacent to the threaded coolant bore to accept and distribute coolant around the bottom of the insert.

12. The toolholder according to claim 11, wherein the manifold is a conically shaped recess.

13. The toolholder according to claim 8, further including a groove extending within the pocket floor between the at least two bypass ports to fluidly connect the bypass ports.

14. The toolholder according to claim 8, wherein the at least two bypass ports are similar in size and are radially symmetric about the body central axis and the toolholder is used for rotating applications.

15. A toolholder system comprised of a toolholder body and a circular cutting insert mounted within the toolholder body, wherein
   a) the toolholder body has:
      i) a bore along a central axis extending therethrough,
      ii) a pocket extending within the top of the toolholder for accepting the circular insert, wherein the pocket is surrounded by a hoop defining a pocket floor, an inner hoop wall, and an outer hoop wall;
      iii) a threaded holding bore extending downwardly through the pocket floor to a central coolant bore, wherein the threaded holding bore is adapted to receive a threaded hold-down bolt;
      iv) at least two bypass ports offset from the threaded holding bore but fluidly connecting the central coolant bore and the pocket floor, thereby able to provide coolant between the central coolant bore and the pocket when a hold-down bolt obstructs the threaded holding bore, and
   b) the circular cutting insert having:
      i) a circular body having a central axis extending therethrough,
      ii) a top surface and a bottom surface;
      iii) a central bore having a diameter and extending through the body between the top surface and the bottom surface;
      iv) a wall extending around the body between the top surface and the bottom surface; and
      v) a cutting edge extending along the intersection of the wall and the top surface, and
      vi) a central plateau extending about the central bore from the top surface of the body, where the plateau includes radial horizontal slots across the top and along the width of the plateau to provide a path for coolant from the central bore of the body,
   c) a hold-down bolt having a head and a shank, wherein a portion of the shank is threadedly engaged with the threaded holding bore and the head retains the cutting insert within the pocket, wherein the shank diameter in the region of the cutting insert bore is sufficiently less than the diameter of the central bore such that there is a gap therebetween fluidly connecting the at least two bypass ports with the radial horizontal slots of the cutting insert.

16. The toolholder system according to claim 15, wherein the wall of the insert is cylindrical or tapered and the inner hoop wall is cylindrical or tapered and sized such that there is an interference fit between the insert and the pocket.

17. The toolholder system according to claim 16, wherein the central coolant bore extends to the threaded holding bore.

18. The toolholder system according to claim 17, wherein each of the at least two bypass ports is a cylindrical bore through the toolholder body adjacent to the threaded holding bore.

19. The toolholder system according to claim 17, wherein the at least two bypass ports have a centerline that is offset from the centerline of the threaded holding bore.

20. The toolholder system according to claim 17, wherein the cutting insert has a planar bottom face that is flush with the planar bottom floor of the pocket to provide a fluid seal therebetween.

21. The toolholder system according to claim 17, wherein the cutting insert has a shoulder beneath the wall that is flush with an end of the toolholder to provide a fluid seal therebetween.

22. The toolholder system according to claim 17, further including a manifold recessed within the pocket floor adjacent to the threaded coolant bore to accept and distribute coolant around the bottom of the insert into the insert central bore.

23. The toolholder system according to claim 22, wherein the manifold is a conically shaped recess.

24. The toolholder according to claim 22, further including a groove extending within the pocket floor between the two bypass ports to fluidly connect the bypass ports.

25. The toolholder system according to claim 15, wherein the portion of the hold-down bolt shank in the region of the insert central bore is unthreaded.

26. The toolholder system according to claim 15, wherein the underside of the hold-down bolt head is planar and is flush with the top of the plateau.

27. The toolholder system according to claim 26, wherein the top of the plateau is planar.

28. The toolholder system according to claim 15, wherein the at least two bypass ports are similar in size and are radially symmetric about the body central axis and the toolholder is used for rotating applications.

29. A cutting insert comprised of a circular body having a central axis extending therethrough, wherein the insert is intended to machine a workpiece and, wherein the body has:
   1) a top surface, a bottom surface, a side extending downward from the to surface and an inwardly extending shoulder adjacent thereto, wherein the shoulder ma be utilized to axially locate the insert within a pocket;
   2) a central bore having a diameter and extending through the body between the top surface and the bottom surface;
   3) a wall extending around the body between the top surface and the bottom surface, wherein there are only two diametrically opposed indentations within the wall adapted to engage protrusions within the inner wall of a pocket within a toolholder body to prevent relative rotation of the insert relative to the toolholder body; and
   4) a cutting edge extending along the intersection of the wall and the top surface.

30. The cutting insert according to claim 29, wherein the indentations extend from the bottom surface up the wall of the insert.

31. The cutting insert according to claim 29, wherein the wall is cylindrical or tapered inwardly from the top surface to the bottom surface.

32. The cutting insert according to claim 31, wherein the bottom surface of the insert is planar and flat.

33. A toolholder for holding a circular cutting insert, wherein the insert is intended to machine a workpiece and, wherein the toolholder is comprised of a body having central axis extending therethrough, wherein the body is comprised of:
   a) a pocket extending within the top of the toolholder for accepting the circular insert, wherein the pocket is surrounded by a hoop defining a pocket floor, an inner hoop wall, and an outer hoop wall;
   b) wherein the hoop is generally circular with a hoop diameter but follows an oscillating serpentine path about a radius defining a cylinder to provide flexibility for radial expansion of the hoop; wherein the serpentine path is comprised of interior slices taken from the inner hoop wall and exterior slices taken from the outer hoop wall.

34. The toolholder according to claim 33, wherein the slices are curved and form an arc about the inner wall and the outer wall.

35. The toolholder according to claim 34, wherein the slices may have a shape with flat or curved surfaces.

36. The toolholder according to claim 33, wherein the inner hoop wall has a diameter and the outer hoop wall has a diameter and, wherein hoop walls between the slices maintain their respective diameter.

37. The toolholder according to claim 33, wherein the interior slices alternate with the exterior slices about the circumference of the hoop.

38. The toolholder according to claim 33, wherein the interior slice in the inner wall comprises a cylindrical hole extending into the pocket floor, wherein a cylindrical hole centerline is spaced from the inner wall such that a projection of the cylindrical hole onto the inner wall is an arc.

39. The toolholder according to claim 33, further including at least two protrusions extending radially inwardly from the pocket, wherein the protrusions are adapted to engage matching indentations from a side of a cutting insert mounted within the pocket.

40. The toolholder according to claim 39, wherein the protrusions are located adjacent to the pocket floor.

41. The toolholder according to claim 40, wherein the protrusions are located at the intersection of the inner wall and the pocket floor.

42. The toolholder according to claim 39, wherein the protrusions may be pins extending upwardly from the cylindrical hole associated with the interior slice.

43. The toolholder according to claim 33, wherein the inner wall of the pocket is cylindrical or tapered inwardly from the floor upwardly and adapted to engage the cylindrical or tapered wall of a cutting insert.

44. The toolholder according to claim 33, further including a cutting insert comprised of a circular body having a central axis extending therethrough, wherein the body has:
   a) a top surface and a bottom surface;
   b) a central bore having a diameter and extending through the body between the top surface and the bottom surface;
   c) a side extending around the body between the top surface and the bottom surface, wherein there are only two diametrically opposed indentations within the side;

d) a cutting edge extending along the intersection of the wall and the top surface; and
e) wherein the opposed indentations of the insert side engage protrusions within the inner wall of the toolholder pocket to prevent relative rotation of the insert relative to the toolholder body.

45. The toolholder according to claim 44, wherein the wall of the insert is cylindrical or tapered and the inner wall of the hoop is cylindrical or tapered and the walls mate with one another to form an interference fit.

46. The toolholder according to claim 45, wherein the bottom surface of the insert abuts against the floor of the pocket to axially locate the insert within the toolholder body.

47. The toolholder according to claim 45, wherein the cutting insert further includes an inwardly extending shoulder beneath the wall and wherein the shoulder abuts with an end of the toolholder to axially locate the cutting insert within the toolholder body.

48. The toolholder according to claim 33, further including a hold-down bolt passing through a central bore within the insert and threadably secured within a threaded holding bore of the toolholder body, wherein the hold-down bolt has a head which contacts the top surface of the insert body to retain the insert body within the pocket.

49. The toolholder according to claim 33, wherein elements of the toolholder are in a symmetric relationship with one another and the toolholder is used for rotating applications.

\* \* \* \* \*